Figure 1:
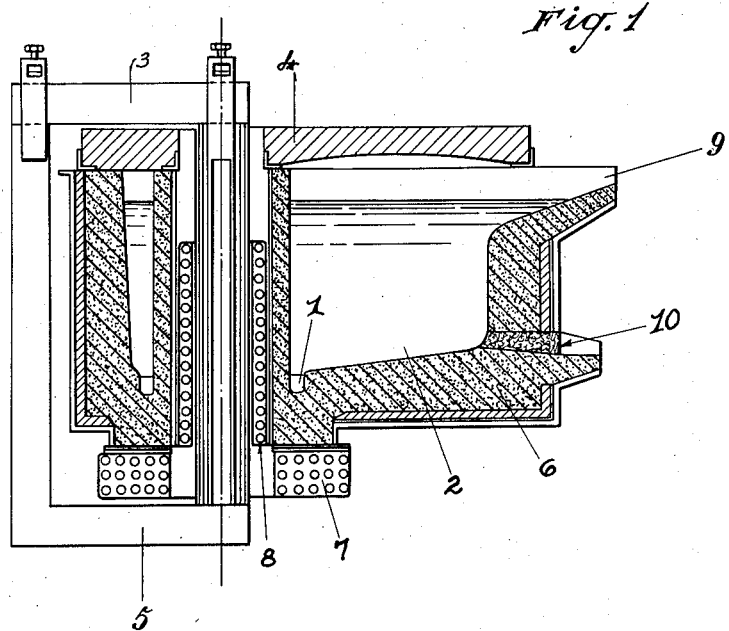
Figure 2:
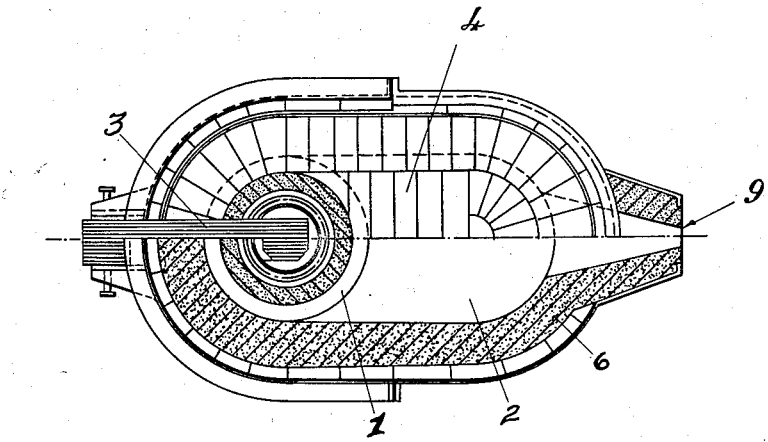

June 10, 1958  G. A. TAGLIAFERRI  2,838,587
DUCTLESS ELECTRIC INDUCTION FURNACE AND
PROCESS FOR THE STARTING THEREOF
Filed July 12, 1955

INVENTOR.
GIACOMO ALDO TAGLIAFERRI
BY

United States Patent Office 2,838,587
Patented June 10, 1958

2,838,587

METHOD FOR THE CONDENSATION OF CHLORINATED RUBBER AND AROMATIC COMPOUNDS AND PRODUCT OBTAINED

Marcel Prettre, Lyon, Edouard Grimaud, Vienne, and René Allirot, Plombieres, France, assignors to Société Anonyme dite: Société d'Electro-Chimie, d'Electro-Metallurgie et des Acieries Electriques d'Ugine, Paris, France, a corporation of France No Drawing. Application May 19, 1953
Serial No. 356,088

Claims priority, application France May 24, 1952

9 Claims. (Cl. 260—772)

The present invention has for its object the preparation of products of condensation of chlorinated rubber with aromatic compounds, with increased qualities of conservation and use, especially in decreasing the content in labile chlorine.

Another object of the present invention is the constitution of a great variety of products of condensation with a chlorinated rubber base by varying the structure of the elementary pattern and the chemical composition of the macromolecule.

The present invention concerns a specific method for condensating chlorinated rubber and its aromatic compounds, which does away with the disturbing reactions of dehydrochlorination of the chlorinated rubber and which essentially substitutes the most labile fraction of the chlorine contained in the chlorinated rubber.

Other advantages and objects of the present invention will appear in the following description.

It is known that chlorinated rubbers are generally manufactured by causing chlorine in excess to act on natural rubber in solution in a suitable organic liquid. The products which are thus obtained possess the required qualities for the principal uses: resistance to chemical agents, thermal stability, etc. only under the condition of possessing a high content of chlorine, of the order of 62 to 68% by weight. But such a condition does not protect such products from the serious drawbacks which limit their possibilities of application.

First of all, even in case the chlorination has been carried as far as possible, chlorinated rubber easily loses a fraction of the chlorine which it contains, either under the effect of heat, or under the action of certain reagents such as pyridine and aniline. One of the latter substances may even be used in order to determine the percentage of labile chlorine. Thus, a chlorine rubber with 65% of chlorine treated at 100° C. with aniline during 17 hours, loses, by elimination of hydrochloric acid, 14% of said chlorine. Now the dechlorination is a phenomenon which harms the plastic qualities of the products, the structure and the properties of which are unfavourably altered with time.

On another hand, the various chlorinated rubbers with a maximum stability, which may be manufactured, differ from one another only by their average molecular mass and the curve of the distribution of the molecular masses. The chemical composition of each link is the same whatever may be the degree of polymerisation. This identity of composition limits the applications, the diversity of which is a function of the variety of structure of the elementary structural formula of the macromolecule. This is a disadvantage common to all plastics manufactured from only one monomer, and natural rubber together with its derivatives, the only elementary constituent of which is isoprene, do not escape to it.

In order to overcome such an obstacle, the industry of plastics has more and more recurred to copolymerisation of two monomer substances. In varying the nature of one of the monomers and its concentration, it is easy to obtain a wide variety of plastics (linear polymers and polydimensional polymers) the structure and the very different physical properties of which lead to the most various uses. The copolymerisation however frequently has the major inconvenience of causing the appearance in the very heart of the product of an assembly of macromolecules, the chemical composition and the structure, and therefore the properties of which vary together with the degree of polymerisation. This causes a heterogeneity which is often a drawback in plastics manufactured from products of copolymerisation.

One of the general methods which are used for modifying the elementary pattern of a halogenated macromolecule such as that of chlorinated rubbers, consists in effecting the substitution, for example by means of the reaction of Friedel and Crafts, of one or more halogen atoms by hydrocarbon remainders.

Up to now, such a method had not given interesting results, due to the lack of adequate knowledge, obtained by systematic study, of the factors which are likely to help or to hinder the reaction of dehydrochlorination of chlorinated rubber. Indeed, it has been observed that the degradation of chlorinated rubber during the condensation with a hydrocarbonated compound, may result from the action of dehydrochlorination, both by the hydrocarbon reagent and by the necessary condensation agent. The result is that a reaction of dehydrochlorination is added or may even be substituted for the desired condensation reaction, with formation of resinifiable products which are of little use.

Thus the use is to be excluded of compounds which are highly basic such as aniline, pyridine, acetophenol, since it causes, even in the absence of a catalyst capable of acting in the same direction, the dehydrochlorination of the chlorinated rubber. On another hand, U. S. Patent No. 1,890,903, applied for December 28, 1926, shows a method of treating chlorinated rubber by aromatic amines and phenols in the presence of mineral halides, by which thermoplastic products of condensation are obtained. These products are quite different, by their structure and their chemical composition and by their properties, from those which are obtained by the method according to the present invention.

Moreover, the halogenated catalyst of condensation are acido-basic types of compounds according to the conception of G. N. Lewis. They are therefore capable of eliminating molecules of hydrochloric acid both at the sole expense of the molecules of chlorinated rubber (dehydrochlorination) and in taking hydrogen from hydrocarbon compounds and the chlorine from the chlorinated rubber (condensation). The first case is to be particularly feared when the halogenated reagent subjected to the condensation possesses, like chlorinated rubbers, a large proportion of labile chlorine. Habgood (British patent application 8,170 and 24,157, 1936) teaches the production of resinous products by the reaction of benzene with chlorinated rubbers, in the presence of aluminum chloride.

We have found that the above-mentioned disadvantages can be overcome by selecting a compound capable of being condensed which is free from harmful acidobasic characteristics. Moreover, according to the present invention, the working temperature must be maintained relatively low, the concentration of reactants must be maintained within well-defined limits, and a suitable condensation catalyst must be present. Under such general conditions, which will be set forth with greater particularity below, the condensation reaction becomes selective so that instead of dehydrochlorination taking place plastics are formed which are low in unstable chlorine content and are particularly homogeneous in structure and composition.

The present invention has for its object a method of condensation of chlorinated rubber with at least one mono or polynuclear aromatic compound, simple or substituted, without any harmful acido-basic character, with the help of an inorganic halide condensation catalyst, such as, for example, aluminum chloride, ferric chloride, boron fluoride, tin tetrachloride, fundamentally consisting in heating, at a temperature at the utmost equal to 130° C. and preferably equal to 75° C., a mixture of one part by weight of chlorinated rubber for 20 to 300 parts by weight of the aromatic compound and 5 to 20 parts in weight of catalyst, the type and nature of the aromatic reagent, the proportion of the reagents, the temperature and the duration of the reaction being chosen and regulated in order to cause the reaction of dehydrochlorination to retrogress and to favourably or unfavourably influence the formation of bridges between the linear macromolecules of the chlorinated rubber, and thereafter to carefully eliminate the catalyst, at the end of the reaction, by means of one or more acid washings.

The choice of the aromatic reagent of condensation is fixed, on the one hand, by the primordial condition that it be devoid of acido-basic properties according to G. N. Lewis, and on the other hand, by the quality of the plastic product, which it is desired to obtain, with or without intramolecular bridges.

In 1923, Professor G. N. Lewis, of the University of California, defined the acid and basic characteristics of organic compounds, both aromatic and non-aromatic. According to this definition, an acid compound is a substance having one or more atoms with electrophylic characteristic capable of fixing a pair of electrons; the principal acid of this type is the carbonium ion. Lewis further defines a basic compound as a substance having at least one atom capable of giving off electrons; the principal basic compounds of this type are those with at least one atom of oxygen, sulfur or nitrogen.

Thus, based on the above definition, the expression "compounds devoid of acido-basic properties" wherever used in this specification and the claims is intended to embrace those organic compounds which are not provided with an oxygen, sulfur or nitrogen atom and which are incapable of forming a carbonium ion as a cation. Examples of such compounds are benzene, toluene, metaxylene, diphenyl, naphthalene and their halogenated derivatives.

According to the present invention, an essential characteristic lies in a varied choice of the reagent to be condensed and of the operative conditions, in order to preferentially determine the fixation of the aromatic radicals, either on one single molecule of chlorinated rubber, in order to obtain linear polymer such as those which constitute the initial plastic material, or on two molecules, which produces to three dimension polymers, the properties of which vary considerably according to the number of bridges thus realised between chains. In order to obtain one or the other of these results, according to the invention, the five following principles considered simultaneously or separately may serve as a guide.

The bridges principally result from the double condensation of an aromatic nucleus in which two atoms of hydrogen are preferably in para position with respect to one another. Thus the bridging may be favoured or prevented according to the aromatic reagent chosen. The method serves to prevent this and, in such a case provides only linear macromolecules, when using aromatic products in which certain hydrogen atoms are replaced, in convenient positions, by groupings which are not capable of participating to the reaction. On the contrary, if non-substituted organic reagents are chosen, or if they are provided with one single substitution which favours the condensation in ortho and/or para, the method tends to produce bridges, and the plastics thus manufactured have all the properties of the polydimensional polymers.

But a reagent capable of favouring the bridges acts the more energetically, in this sense, the smaller its quantity in the reaction medium with respect to the chlorinated rubber. If, on the contrary it is largely in excess, the bridgings are less numerous, and a large proportion of the aromatic radicals, although they are condensed in greater numbers, is fixed to only one chain of chlorinated rubber. In the limits of concentration which are defined according to the present invention, the lowering of the concentration of the aromatic compound between 20 and 80 parts, for one part of chlorinated rubber not yet transformed, preferentially provides strongly-bridged polymers, whereas a reactional medium containing 150 to 300 parts of aromatic reagent, with one part of chlorinated rubber, considerably limits the bridging, and for certain particular reagents, completely eliminates it.

One may also efficaciously act upon the number of bridgings, by the means which consists in simultaneously condensing on the chlorinated rubber, a mixture, in proportions which are chosen according to the desired aim, of an aromatic compound providing the bridgings (for example benzene) and of the second derivative of the same type which is not capable of providing bridgings (for example metaxylene).

The duration of the treatment, the evolution of which is followed by measuring the liberation of hydrochloric acid, and temperature, enable in all the cases, the number of radicals which are fixed to only one chain and the degree of bridging to be determined at will.

Finally, the nature and concentration of the catalyst can also lead the reaction in a preferential manner.

Whether the five principles hereabove be used separately or in combination, the two limits of proportion which are indicated characterize the products which are obtained and do not depend in any manner upon the degree of polymerisation of the chlorinated rubber subjected to condensation. The new plastic resulting from the present method thus offers a chemical composition and a structure which may be modified as easily as those of plastics manufactured by polymerisation, but, contrarily to the latter, the composition and the structure of a determined material are constant, whatever the molecular weight of each macromolecule of chlorinated rubber subjected to the condensation.

The final result will thus be, according to the operative conditions and the nature of the aromatic reagent which is employed, either to replace a certain number of atoms of chlorine of one single macromolecule of chlorinated rubber by as many aromatic radicals and thus to produce linear polymers, or to fix aromatic radicals on two macromolecules of chlorinated rubber by substitution for two atoms of chlorine for each fixed radical and to end up in polydimensional polymers by reason of the bridgings effected between linear molecules of the chlorinated rubber.

As an example, aromatic reagents of condensation which may be used are benzene, toluene, metaxylene, diphenyl, naphthalene, etc. Among the derivatives of these compounds which have no harmful acido-basifying influence, their halogenated derivatives may be especially cited.

When using for example benzene or toluene, plastics may be obtained with many bridgings, whereas when using metaxylene, for example, the formation of intermolecular bridges is avoided.

Another important characteristic of the present method consists in operating the condensation at a relatively low temperature, preferably less than 75° C. In certain particular cases, in order to help the reaction, the operation may be made at a higher temperature, up to 130° C., in spite of the risks of dehydrochlorination. When operating above 75° C., even in solution in an inert solvent, such as nitrobenzene, the chlorinated rubber liberates substantial quantities of hydrochloric acid as soon as it is in contact with a catalyst such as aluminum chloride. On the contrary, the condensation provides products which become more stable as the temperature at which it is carried out is further removed from the upper limit above indicated.

This limitation in the scale of temperature implies the necessity of recourse to an inert solvent when using aromatic reactives with a high melting point.

The determination of the proportion of the reagents also plays an important part in the method according to the present invention. It also enables the action of the catalyst towards the condensation to be directed selectively.

The fundamental rule consists in constantly maintaining, in contact with the catalyst, a large excess of the aromatic compound to be condensed and to limit, on the contrary, the concentration of the chlorinated rubber in the reaction medium. As already explained, the latter must contain, for one part of chlorinated rubber not yet transformed, 5 to 20 parts (by weight) of catalyst, and 20 to 300 parts of aromatic compounds to be condensed.

In order that they may be made use of, the plastic masses obtained by condensation of chlorinated rubber and aromatic products must be very carefully cleared of any trace of catalyst or of its products of degradation. Indeed the latter would not fail to cause new chemical changes, especially in the course of treatments while hot which are often necessary for the use of plastic masses (calendering, moulding, . . . ). The present method includes, at the end of the reaction of condensation, a series of operations which insure the necessary complete purification. To this end, washing operations are carried out once or many times, with the help of an aqueous solution of a mineral acid. A check of the final pH of the aqueous solution at the end of this washing operation provides the desired guarantee of purification. When the catalyst which is used is aluminum chloride, the washing operation should be continued until a pH value less than 2.5–3.0 is obtained in the washing liquid. Thus is eliminated any trace of catalyst and of its products of degradation. When ferric chloride is being used, washing operations should be continued, in order to be effective to a pH value, below 1.0–1.3. Every time the pH is greater than the maximum value which insures purification, new washing operations should be effected.

The working of the method according to the present invention is carried out in the following manner.

A large excess of aromatic reagent containing the catalyst in suspension, is prepared, into which very limited doses of diluted or not diluted chlorinated rubber are introduced. The dispersion of catalyst may also be slowly poured into the aromatic reagent in a diluted solution of chlorinated rubber. By using the catalyst in the gaseous state, the relative concentrations of the reagents and the catalyst may be still more easily controlled.

The temperature is maintained at the chosen degree below the maximum and the mixture is vigorously stirred. When the production of hydrochloric acid ceases, the condensation is complete.

The organic solution, containing the obtained plastic together with the catalyst, is then decanted. It is then intimately put in contact with an aqueous solution of hydrochloric acid, for instance, in order to allow the rapid and complete removal of the catalyst and of other undesirable products by the washing liquid.

A check is then made in order to see whether the pH of the acid washing solution is below the permissible maximum for each type of catalyst.

At the end of these operations, the organic phase is decanted, treated with soda and rinsed in water. The solvent or solvents are carried off by steam or by any other usual method and the plastic is obtained in the shape of a powdered solid devoid of impurities and which requires no particular precaution or further treatment for its perfect conservation and applications.

The operative conditions and the results provided by the working of the method according to the present invention necessarily entail a diminution of the content of the chlorinated rubbers in labile chlorine. The fixation of the aromatic product at each point, whether there be any or no bridging, indeed entails the removal, in the form of hydrochloric acid, of an atom of chlorine of the chlorinated rubber and of an atom of hydrogen of the fixed aromatic product. Now, the method according to the invention is carried out so as to essentially use the most labile fraction of the chlorine contained in the chlorinated rubber. The treatment therefore considerably diminishes the content in labile chlorine of the new plastic which is obtained. This content is easily twice to four times smaller than that of the best chlorinated rubbers known to date.

The method also permits the production of plastics, the structure of which varies as much as the products which are manufactured by copolymerisation.

Finally, the method provides a guarantee against the eventuality of a dehydrochlorination of the chlorinated rubber by the fact that it includes a prior check of the constancy of the content in chlorine of the chlorinated rubber dissolved in a solvent containing a great excess of the aromatic reagent to be condensed and maintained at a temperature substantially higher than 70–75° C. during this check.

A few examples of the working of the invention are given hereunder.

*Example 1*

Chlorinated rubber, purified, containing 65% of chlorine was subjected to the test of stability by aniline (heating at 100° C. during 17 hours) which had indicated that 14% of the chlorine was "labile." The aromatic product chosen for condensation was toluene.

200 grams of this chlorinated rubber were dissolved in 2 kg. of toluene and the solution was heated during 10 hours at boiling point. At the end of this period, the chlorinated rubber showed no alteration in the content in chlorine nor in the percentage of labile chlorine. This previous test was a guarantee against any deterioration of the chlorinated rubber during the subsequent operations.

The catalyst which was used was aluminum chloride. In the reaction vessel, 200 grams of this product were put in suspension in 1 kg. of toluene and the mixture, brought up to 50° C. was vigorously stirred. The solution of this chlorinated rubber in toluene was progressively introduced in the vessel at constant rate which should never exceed 1 kg. per hour, in order to remain within the limits fixed for the concentration of chlorinated rubber not yet transformed. During the whole operation, the temperature of 50° C. was carefully maintained and the output of hydrochloric acid was closely watched.

The operation was completed in two hours and thirty minutes, which was shown by the cessation of the production of acid. The reaction mass was then poured into two liters of an aqueous solution of hydrochloric acid at 100 grams per liter. The whole was energetically agitated for 15 minutes. This operation was repeated a second time on the decanted organic phase. A second decantation gave an aqueous phase the pH value of which, equalling 1.6, was a guarantee that any trace of compound of aluminum was eliminated from the organic phase. This was then treated with water made alkaline with soda (one liter of solution 2N) and rinsed in water.

The toluene was then eliminated with steam. A grey powder was then collected which is very soluble in the solvents of chlorinated rubber and substantially titrating, in weight:

| | Percent |
|---|---|
| Chlorine | 55 |
| Carbon | 40 |
| Hydrogen | 4 | which indicates that in an individual macromolecule, about 60% of the chains $C_{10}H_{11}Cl_7$ have fixed a group $C_6H_4CH_3$. A test with aniline showed that the percentage of labile chlorine in the obtained product had fallen to 7.5% of the total remaining chlorine, at the end of the treatment of condensation.

*Example 2*

The reagents and the catalyst used were the same as those of Example 1, as were also the quantities employed and the operating method, except as concerns the temperature which was maintained at 60° C. throughout the condensation.

The powdered product obtained at the end of the purifying and extracting operations contained 54% chlorine, but its content of labile chlorine was 10.3%.

*Example 3*

The same chlorinated rubber was condensed with metaxylene in the following conditions:

150 grams of aluminum chloride were put in suspension in 1 kg. of metaxylene and the whole was introduced into a reaction vessel where it was violently stirred and brought up to 40° C. A solution of 100 grams of chlorinated rubber in 1.5 kgs. of metaxylene was thereafter progressively poured into the suspension of catalyst at a rate of 0.5 kg. per hour, which kept, in the concentration of chlorinated rubber not yet transformed in the reaction medium at the lower limit of concentration, while avoiding any dehydrochlorination. The reaction was completed in three and a half hours.

The purifying operations were carried out as in Example 1. One washing operation in the solution of hydrochloric acid sufficed to insure the purification (final pH: 2.3).

The product obtained was a powder, soluble in the solvents of chlorinated rubber titrating 47.5 in chlorine. It was constituted of linear molecules and its percentage in labile chlorine was only 5%. When subjected to a systematic fractionation, this product gave fractions the study of which has shown that the chemical and structural composition were identical.

*Example 4*

100 grams of chlorinated rubber dissolved in 1,000 cc. of benzene were poured into 150 cc. of benzene containing 150 grams of $BF_3$-ethylic ester complex.

The reactional mass was maintained during 24 hours at 70° C. and during 48 hours at surrounding temperature. The isolated polymer divided into three main fractions:

(*a*) A fraction soluble in benzene (30 parts by weight) and containing 55.4% of chlorine.

(*b*) A fraction insoluble in benzene, but soluble in dioxane (17 parts) and containing 58% of chlorine.

(*c*) A fraction insoluble in benzene and dioxane (53 parts) titrating 49.3% of chlorine.

*Example 5*

200 grams of anhydrous $FeCl_3$ were put in suspension in 200 cc. of pure benzene. 1,000 cc. were added, while agitating, of a 10% benzenic solution of chlorinated rubber. The temperature was maintained at 60° C. during 8 hours. The reaction product was isolated as previously described, while watching that the pH of the washing water should not be greater than 1.3.

The reaction product was constituted as to one half by a fraction soluble in benzene and titrating 63.9% of chlorine and as to the other half by a fraction insoluble in the aromatic hydrocarbons and containing 57.6% chlorine.

We claim:

1. The method of condensing chlorinated rubber with aromatic compounds which comprises the steps of heating to a temperature below 130° C., a mixture containing, as the sole reactive ingredients, one part by weight of chlorinated rubber, 20 to 300 parts by weight of a neutral aromatic compound selected from the group consisting of aromatic hydrocarbons, and their lower alkyl and halogen derivatives and 5 to 20 parts by weight of an inorganic halide condensation catalyst selected from the group consisting of aluminum chloride, ferric chloride, stannic chloride and boron fluoride, until the production of acid ceases; and thereafter leaching the said condensation product with an acid medium until the catalyst is completely eliminated from the said product.

2. The method of claim 1 wherein the said condensation product is leached with aqueous hydrochloric acid until the product has a pH of below about 3.0.

3. The product produced by the process of claim 1.

4. The method of claim 1 wherein the condensation temperature is maintained below 75° C.

5. The method of claim 4 wherein the said neutral aromatic compound is reacted in a ratio of 20 to 80 parts by weight.

6. The method of claim 4 wherein the said neutral aromatic compound is reacted in a ratio of 150 to 300 parts by weight.

7. The method of condensing chlorinated rubber with benzene which comprises the steps of heating to a temperature below 130° C., a mixture containing, as the sole active ingredients, one part by weight of chlorinated rubber, 20 to 80 parts by weight of benzene, and 5 to 20 parts by weight of an inorganic halide condensation catalyst selected from the group consisting of aluminum chloride, ferric chloride, stannic chloride and boron fluoride, until the production of acid ceases; and thereafter leaching said condensation product with an acid medium until the catalyst is completely eliminated from said condensation product.

8. The method of condensing chlorinated rubber with toluene which comprises the steps of heating to a temperature below 130° C., a mixture containing, as the sole reactive ingredients, one part by weight of chlorinated rubber, 20 to 80 parts by weight of toluene, and 5 to 20 parts by weight of an inorganic halide condensation catalyst selected from the group consisting of aluminum chloride, ferric chloride, stannic chloride, and boron fluoride, until the production of acid ceases; and thereafter leaching said condensation product with an acid medium until the catalyst is completely eliminated from said condensation product.

9. The method of condensing chlorinated rubber with metaxylene which comprises the steps of heating to a temperature below 130° C., a mixture containing, as the sole reactive ingredients, one part by weight of chlorinated rubber, 150 to 300 parts by weight of metaxylene and 5 to 20 parts by weight of an inorganic halide condensation catalyst selected from the group consisting of aluminum chloride, ferric chloride, stannic chloride and boron fluoride, until the production of acid ceases; and thereafter leaching said condensation product with an acid medium until the catalyst is completely eliminated from said condensation product.

References Cited in the file of this patent

UNITED STATES PATENTS

| 1,555,131 | McGavack | Sept. 29, 1925 |
| 1,890,903 | Fisher | Dec. 13, 1932 |
| 2,091,878 | Peterson | Aug. 31, 1937 |

FOREIGN PATENTS

| 658,520 | Great Britain | Oct. 10, 1951 |